(12) United States Patent
Lougheed

(10) Patent No.: US 11,060,819 B2
(45) Date of Patent: Jul. 13, 2021

(54) ARMORED VEHICLE, METHOD, AND WEAPON MEASUREMENT SYSTEM FOR DETERMINING BARREL ELEVATION

(71) Applicant: General Dynamics Mission Systems—Canada, Ottawa (CA)

(72) Inventor: James Hugh Lougheed, Kinburn (CA)

(73) Assignee: General Dynamics Mission Systems—Canada, Ottawa (CA)

( * ) Notice: Subject to any disclaimer, the term of this patent is extended or adjusted under 35 U.S.C. 154(b) by 124 days.

(21) Appl. No.: 16/420,625

(22) Filed: May 23, 2019

(65) Prior Publication Data

US 2020/0370868 A1    Nov. 26, 2020

(51) Int. Cl.
| | |
|---|---|
| *F41G 3/32* | (2006.01) |
| *G01B 11/26* | (2006.01) |
| *F41H 7/02* | (2006.01) |
| *F41A 23/24* | (2006.01) |
| *F41G 5/26* | (2006.01) |
| *G01S 3/00* | (2006.01) |

(52) U.S. Cl.
CPC .............. *F41G 3/323* (2013.01); *G01B 11/26* (2013.01); *F41H 7/02* (2013.01)

(58) Field of Classification Search
CPC ............ F41G 3/323; G01B 11/26; F41H 7/02
See application file for complete search history.

(56) References Cited

U.S. PATENT DOCUMENTS

| | | | |
|---|---|---|---|
| 3,953,132 A * | 4/1976 | Michelsen ................ | F41G 3/26 356/141.1 |
| 4,142,799 A | 3/1979 | Barton | |
| 4,383,474 A | 5/1983 | Paurus et al. | |
| 4,665,795 A | 5/1987 | Carbonneau et al. | |
| 4,676,636 A | 6/1987 | Bridges et al. | |
| 4,922,801 A * | 5/1990 | Jaquard ..................... | F41G 3/06 235/412 |
| 5,189,245 A | 2/1993 | Bundy | |
| 5,574,479 A | 11/1996 | Odell | |
| 5,883,719 A | 3/1999 | Coope | |

(Continued)

FOREIGN PATENT DOCUMENTS

| | | |
|---|---|---|
| DE | 4344998 A1 | 7/1995 |
| FR | 2505477 A1 | 11/1982 |

(Continued)

*Primary Examiner* — Hina F Ayub
(74) *Attorney, Agent, or Firm* — LKGlobal | Lorenz & Kopf, LLP

(57) ABSTRACT

Armored vehicles, weapon measurement system, and methods for determining barrel elevation of a gun, are provided. In one example, an armored vehicle includes a vehicle body portion and a gun having a barrel extending away from the vehicle body portion at a barrel elevation angle. A weapon measurement system includes a reference light generator arrangement configured to generate a reference light at a single wavelength or within a narrow wavelength band and to diffuse the reference light, thereby defining a distributed reference light. An image sensor arrangement includes an image sensor and a filter. The filter is configured to substantially block light that is at a different wavelength than the distributed reference light while allowing the distributed reference light to pass through to the image sensor for determining the barrel elevation angle.

20 Claims, 2 Drawing Sheets

(56) References Cited

U.S. PATENT DOCUMENTS

| | | | |
|---|---|---|---|
| 6,072,400 A | 6/2000 | Johnson et al. | |
| 6,341,014 B1 | 1/2002 | Maurel et al. | |
| 6,639,659 B2 | 10/2003 | Granger | |
| 6,729,223 B2 | 5/2004 | De Lapasse | |
| 7,124,676 B1 | 10/2006 | Lowrance et al. | |
| 7,184,136 B2 | 2/2007 | McHugh | |
| 7,227,627 B1 | 6/2007 | Bussard | |
| 7,298,468 B2 | 11/2007 | Hofbauer | |
| RE46,480 E | 7/2017 | Hines et al. | |
| 2016/0109560 A1* | 4/2016 | Yanobe | G01S 7/4817 356/4.01 |

FOREIGN PATENT DOCUMENTS

| | | |
|---|---|---|
| GB | 1603144 A | 11/1981 |
| GB | 2085586 A | 4/1982 |
| GB | 2183315 A | 6/1987 |
| GB | 2328498 A | 2/1999 |
| WO | 2004055466 A1 | 7/2004 |
| WO | 20100332181 A1 | 12/2010 |
| WO | 20140118723 A1 | 5/2014 |
| WO | 2016155982 A1 | 10/2016 |
| WO | 2017207487 A1 | 12/2017 |
| WO | 2018234204 A1 | 12/2018 |

* cited by examiner

ARMORED VEHICLE, METHOD, AND WEAPON MEASUREMENT SYSTEM FOR DETERMINING BARREL ELEVATION

TECHNICAL FIELD

The technical field relates generally to weapon systems for armored vehicles, and more particularly, relates to weapon measurement systems for determining barrel elevation of a gun of an armored vehicle, armored vehicles including such weapon measurement systems, and methods for using such weapon measurement systems.

BACKGROUND

Many armored vehicles, for example, for the military and/or other industries, include a weapon system. Often these weapon systems include a gun that is mounted to the armored vehicle's turret from which the gun can be fired. Hitting a distant target with a round (e.g., projectile) fired from the armored vehicle weapon system requires that the barrel of the gun be elevated from a line-of-sight to compensate for a drop of the round during flight. In particular, a gunner in the turret has control over both the swing of the turret and the elevation of the gun barrel. The gun, which is fixed to the turret, moves in azimuth as the gunner swings the turret. As the gunner is acquiring a distant target, the gunner swings the turret until the distant target comes into view. Then, using a laser rangefinder, computer, and/or the like, generates a super-elevation angle for the gun barrel for hitting a target. This "super-elevation angle" of the gun barrel is an important part of a ballistic solution for hitting a target.

Larger armored vehicles, such as tanks (e.g., M1 Abrams) or the like, may be equipped with relatively sophisticated and/or expensive devices to accurately measure the gun barrel angle, such as, for example, a differential resolver (e.g., analog triple phase rotary encoder that measures phase) or the like. Many other armored vehicles, such as light armored vehicles (e.g., LAV, Bradley, etc.), relatively small armored vehicles, and/or the like, are however not equipped with such sophisticated devices for measuring the gun barrel angle. For some of these armored vehicles, the elevation of the gun barrel may be mechanically linked to a mirror. The gunner uses the mirror and, based on the distance of the target and the type of ammunition, selects a reticle mark on their gun sight to adjust the barrel elevation of their gun to compensate for the drop of the round during flight to the target. Unfortunately, this approach is inferior to more sophisticated and/or expensive electronic or computed ballistic solutions. As such, for many armored vehicles, accurately pointing the weapon for hitting, for example, a distant target remains a challenge.

Accordingly, it is desirable to provide a weapon measurement system for determining barrel elevation of a gun of an armored vehicle, armored vehicles including such weapon measurement systems, and methods for using such weapon measurement systems that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an armored vehicle, a weapon measurement system for an armored vehicle that includes a gun having a barrel adapted to extend at a barrel elevation angle, and a method for determining barrel elevation of a barrel of a gun of an armored vehicle, are provided herein.

In a first non-limiting embodiment, the armored vehicle includes, but is not limited to, a vehicle body portion. The armored vehicle further includes, but is not limited to, a gun having a barrel extending away from the vehicle body portion at a barrel elevation angle. The armored vehicle further includes, it is not limited to, a weapon measurement system for determining barrel elevation. The weapon system includes, but is not limited to, a reference light generator arrangement that is mounted to the barrel and that is configured to generate a reference light at a single wavelength or within a narrow wavelength band and to diffuse the reference light, thereby defining a distributed reference light. The weapon system further includes, but is not limited to, an image sensor arrangement that is mounted to the vehicle body portion. The image sensor arrangement includes an image sensor that is configured to detect light including positional information associated with the light. A filter is configured to substantially block light that is at a different wavelength than the distributed reference light while allowing the distributed reference light to pass through to the image sensor for determining the barrel elevation angle.

In another non-limiting embodiment, the weapon measurement system includes, but is not limited to, a reference light generator arrangement mountable to the barrel and configured to generate a reference light at a single wavelength or within a narrow wavelength band and to diffuse the reference light, thereby defining a distributed reference light. The weapon measurement system further includes, but is not limited to, an image sensor arrangement mountable to a vehicle body portion of the armored vehicle. The image sensor arrangement includes an image sensor configured to detect light including positional information associated with the light. A filter is configured to substantially block light that is at a different wavelength than the distributed reference light while allowing the distributed reference light to pass through to the image sensor for determining the barrel elevation angle.

In another non-limiting embodiment, the method includes, but is not limited to, generating a reference light at a single wavelength or within a narrow wavelength band via a reference light generator arrangement that is mounted to the barrel. The method further includes, but is not limited to, diffusing the reference light to define a distributed reference light. The method further includes, but is not limited to, filtering light via an image sensor arrangement that is mounted to a vehicle body portion of the armored vehicle to substantially block light that is at a different wavelength than the distributed reference light while allowing the distributed reference light passed through to an image sensor that is configured to detect light including positional information associated with the light. The method further includes, but is not limited to, detecting the distributed reference light via the image sensor for determining a barrel elevation angle.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
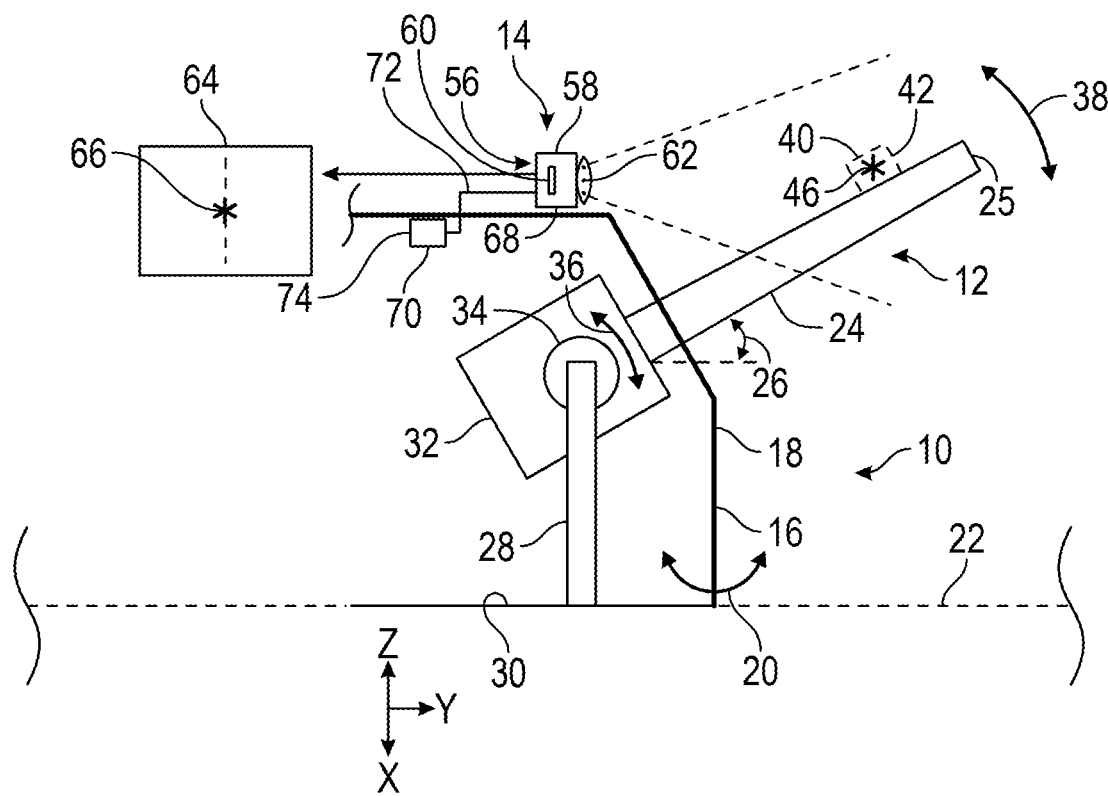
FIG. 1 illustrates a cross-sectional side view of a portion of an armored vehicle including a gun and a weapon measurement system for determining barrel elevation in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to weapon measurement systems for determining barrel elevation of a gun of an armored vehicle, armored vehicles including such weapon measurement systems, and methods for using such weapon measurement systems. In an exemplary embodiment, an armored vehicle includes a vehicle body portion and a gun that has a barrel extending away from the vehicle body portion at a barrel elevation angle. A weapon measurement system includes a reference light generator arrangement that is mounted to the barrel and an image sensor arrangement that is mounted to the vehicle body portion. The reference light generator arrangement is configured to generate a reference light at a single wavelength or within a narrow wavelength band and to diffuse the reference light, thereby defining a distributed reference light. The image sensor arrangement includes an image sensor (e.g., light sensor, video sensor, or the like) and a filter. The image sensor is configured to detect light including positional information associated with the light. The filter is configured to substantially block light that is at a different wavelength than the distributed reference light while allowing the distributed reference light to pass through to the image sensor for determining the barrel elevation angle. In an exemplary embodiment, the reference light generated by the reference light generator arrangement is a relatively small, narrow-angle beam (e.g., narrow-angle or collimated beam such as produced by a laser) that is diffused, distributed, or otherwise spread by a diffuser to produce a spot (e.g., light spot) that remains relatively small and bright but is broadly visible to the image sensor arrangement over a large range of angles that the barrel of the gun moves or otherwise can swing.

In an exemplary embodiment, advantageously it has been found that by diffusing the reference light, the distributed reference light is visible to the image sensor arrangement over a full range of gun barrel angles and positions for accurately determining the barrel elevation angle of the gun. Further, in an exemplary embodiment, advantageously by generating the reference light at a single wavelength or within a narrow wavelength band, the filter of the image sensor arrangement can enhance contrast of the distributed reference light against background light, for example background light from the sun, terrain, or the like, for accurately determining the barrel elevation angle of the gun. Additionally, in an exemplary embodiment, advantageously the weapon measurement system is relatively inexpensive compared to conventional sophisticated electronic or computed ballistic solutions for measuring the gun barrel angle.

FIG. 1 illustrates a cross-sectional side view of a portion of an armored vehicle 10 including a gun 12 and a weapon measurement system 14 for determining barrel elevation in accordance with an exemplary embodiment. The armored vehicle 10 includes a vehicle body portion 16 that supports the gun 12. In an exemplary embodiment, the vehicle body portion 16 is a turret 18 that provides a weapon mount for the gun 12 and affords protection for the crew of the armored vehicle. As illustrated, the turret 18 is configured to rotate in a substantially horizontal X & Y-axis plane (indicated by double headed arrow 20) relative to a main body portion 22 of the armored vehicle 10 to change or otherwise reposition the X, Y coordinate position of the gun 12.

The gun 12 includes a barrel 24 extending away from the turret 18 at a barrel elevation angle (indicated by double headed arrow 26). In an exemplary embodiment, the gun 12 is configured to change or otherwise reposition the Z coordinate position of the gun 12 to change or otherwise alter the barrel elevation angle 26, for example, as part of a ballistic solution for hitting a distant target. As illustrated, the gun 12 includes a gun support 28 that is mounted on a base 30 of the turret 18, a gun block 32 that is rotationally coupled to the gun support 28 by a trunnion(s) 34, and the barrel 24 that extends distally from the gun block 32 to a muzzle 25. In particular, the gun block 32 rotates relative to the gun support 28 via the trunnion(s) 34 (indicated by double headed arrow 36) to change or otherwise alter the barrel elevation angle (indicated by double headed arrow 38) of the barrel 24.

Figure 2:
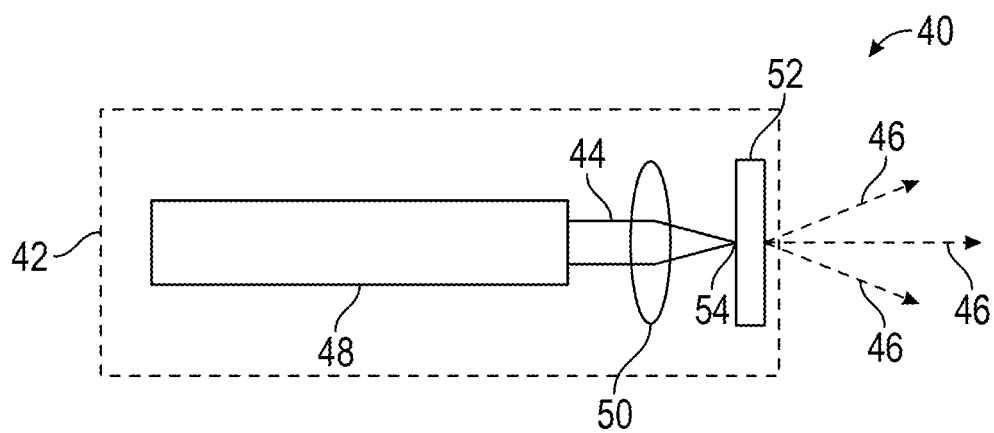
FIG. 2 illustrates a cross-sectional side view of a reference light generator arrangement of a weapon measurement system for determining barrel elevation in accordance with another exemplary embodiment.
Figure 3:
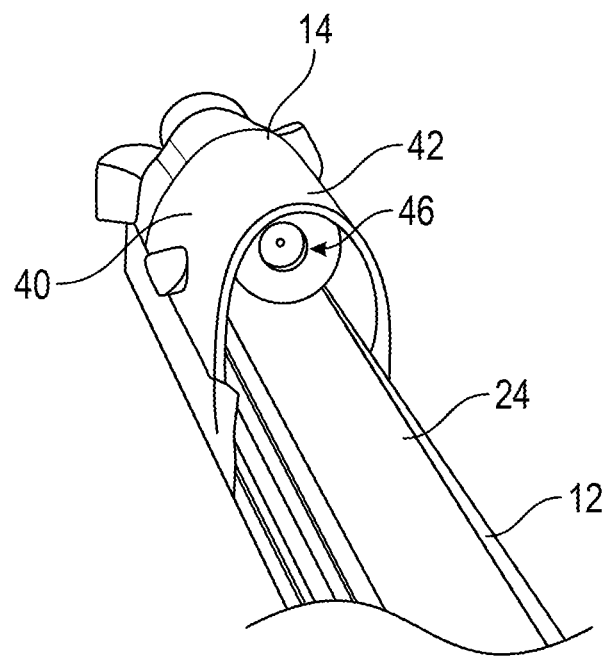
FIG. 3 illustrates a perspective view of a portion of a gun including a muzzle and a reference light generator arrangement mounted to a barrel of the gun in accordance with an exemplary embodiment.

In an exemplary embodiment, the weapon measurement system 14 includes a reference light generator arrangement 40 that is mounted to the barrel 24, for example, proximal of the muzzle 25. Referring also to FIGS. 2-3, the reference light generator arrangement 40 includes a housing 42 that may be directly mounted to the barrel 24, or alternatively, indirectly mounted to the barrel 24, for example, via one or more brackets and fasteners.

The reference light generator arrangement 40 is configured to generate a reference light 44 at a single wavelength or within a narrow wavelength band and to diffuse the reference light 44 to form a distributed reference light 46. As used herein, the phases "to diffuse light" and "distributed reference light" is understood to mean light that is diffused, distributed or otherwise spread, for example, from a collimated light to light that is visible from a relatively wide range of angles and/or perspectives. In an exemplary embodiment, the reference light 44 is at a single wavelength of from about 400 to about 1000 nm. In another exemplary embodiment, the reference light 44 is within a narrow wavelength band that has a wavelength band width of from about 0.5 to about 50 nm in which the narrow wavelength band falls in a wavelength range of from about 400 to about 1000 nm. Alternatively, the reference light 44 may be a single wavelength outside of the range of from about 400 to about 1000 nm, or a narrow wavelength band outside of the range of from about 0.5 to about 50 nm and/or which falls outside of the wavelength range of from about 400 to about 1000 nm.

As illustrated, the reference light generator arrangement 40 includes a reference light source 48, which generates the reference light 44, a lens 50 and a diffuser 52 that are disposed in the housing 42. In an exemplary embodiment, the lens 50 focuses the reference light 44 to a focal point 54 and the diffuser 52 is disposed proximate the focal point 54 to efficiently diffuse the reference light 44 to produce the distributed reference light 46. In an exemplary embodiment, the reference light source 48 is a laser, such as, for example, a diode laser that is configured to generate the reference light 44 at the single wavelength, or for example, depending on temperature, within a narrow wavelength band as discussed above. Alternatively, devices other than a laser (e.g., Xenon light source or the like) may be used for generating the reference light 44 provided such devices can generate light at a single wavelength or within a narrow wavelength band.

The weapon measurement system 14 further includes an image sensor arrangement 56 that is mounted to the turret 18. As illustrated, the image sensor arrangement 56 includes a housing 58 that houses an image sensor 60 and a filter 62. The housing 58 may be directly mounted to the turret 18, or alternatively, indirectly mounted to the turret 18, for example, via one or more brackets and fasteners.

In an exemplary embodiment, the reference light 44 generated by the reference light generator arrangement 40 is a relatively small, narrow-angle beam (e.g., narrow-angle or collimated beam such as produced by a laser) that is diffused, distributed, or otherwise spread by the diffuser 52 to produce a spot (e.g., light spot) 44 that remains relatively small and bright but is broadly visible to the image sensor arrangement 56 over a large range of angles that the barrel 24 of the gun 12 moves or otherwise can swing. Additionally, the housing 42 of the reference light generator arrangement 40 may be configured (e.g., tubular-shaped housing or the like) to allow the spot 44 to be highly visible, for example, only to the turret 18 and optionally proximate area(s) while shielding or substantially blocking visibility of the spot 44 in directions away from the armored vehicle 10.

The image sensor 60 is configured to detect light, that may include a relatively broad range of wavelengths, for example that may include the wavelengths corresponding to outdoor or background environmental light, but that at least includes the wavelength or wavelengths of the reference light 44. Additionally, the image sensor 60 is configured to detect or otherwise determined positional information associated with the light. For example, the image sensor 60 may include a series, one or more arrays, or matrix of pixels each of which can detect light and is associated with a corresponding position. When the image sensor 60 detects light, depending upon the position of the light or light source, one or more pixels will detect or otherwise become activated to generate positional information associated with the light.

The filter 62 is configured to substantially block light that is at a different wavelength than the distributed reference light 46 while allowing the distributed reference light 46 to pass through to the image sensor 60 for determining the barrel elevation angle 26. As used herein, the phase "substantially block light" is understood to mean that light is filtered, attenuated, minimized, or otherwise obstructed by at least about 60%, such as at least about 70%, such as at least about 80%, such as at least about 90%, such as at least about 95%, such as at least about 99%, for example, up to 100%. As such, in an exemplary embodiment, the filtered light consists primarily of the distributed reference light 46 which is readily detected by the sensor 60 (detected, distributed reference light 66) to provide an enhanced contrast image 64 of the detected, distributed reference light 66 without or against relatively little background light, for example, background light from the sun, terrain, or the like.

As illustrated, the housing 58, the image sensor 60, and the filter 62 are part of a camera 68. In an exemplary embodiment, the camera 68 includes a processor 70 that is operative to determine the barrel elevation angle 26 based on the detected, distributed reference light 66. Alternatively, the processor 70 may be separate from but in communication with the camera 68. As illustrated, the camera 68 generates an output signal to the processor 70 via communication line 72 in response to the distributed reference light 46 detected by the image sensor 60. In an exemplary embodiment, the output signal includes one or more pixel positions that have been activated depending upon the position of the distributed reference light 46 which corresponds to the position of the barrel 24 of the gun 12. As such, the output signal includes positional information associated with both the distributed reference light 46 and the corresponding position of the barrel 24 of the gun 12. The processor 70, following instructions from a software-based algorithm, calculates the barrel elevation angle 26 based on the detected, distributed reference light 66. In particular, in an exemplary embodiment, the processor 70, via instructions from the software-based algorithm, converts the pixel position(s)/number(s) or positional information from the output signal using trigonometry (e.g., inverse tangent and/or other trigonometric functions), calibrations, off-sets, and/or the like to accurately determine the barrel elevation angle 26. In an exemplary embodiment, the processor 70 is part of an onboard, ballistic computer system 74 that provides a ballistic solution(s) based on a number of calculations for hitting a target.

Figure 4:
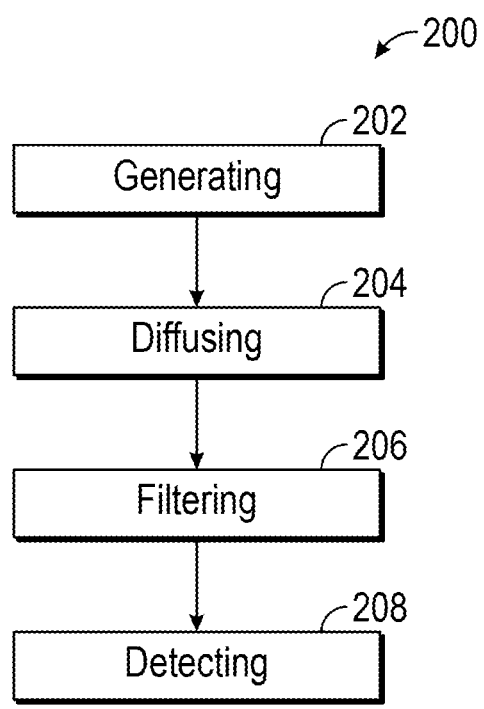
FIG. 4 illustrates a method for determining barrel elevation of a barrel of a gun in accordance with an exemplary embodiment.

FIG. 4 illustrates a method 200 for determining barrel elevation of a barrel of a gun in accordance with an exemplary embodiment. The method 200 includes generating (STEP 202) a reference light at a single wavelength or within a narrow wavelength band via a reference light generator arrangement that is mounted to the barrel. The reference light is diffused (STEP 204) to define a distributed reference light.

An image sensor arrangement is mounted to a vehicle body portion of the armored vehicle. The image sensor arrangement filters light (STEP 206) to substantially block light that is at a different wavelength than the distributed reference light while allowing the distributed reference light passed through to an image sensor that is configured to detect light including positional information associated with the light. The image sensor detects (STEP 208) the distributed reference light for determining a barrel elevation angle.

EXAMPLE SECTION

The following is an example in accordance with various exemplary embodiments. The example is provided for illustration purposes only and is not meant to limit the various embodiments of the weapon measurement systems in any way.

Example—Weapon Measurement System for Determining Barrel Elevation of a Gun of an Armored Vehicle As illustrated in FIG. 1, a camera 68 is mounted behind a barrel 24 and obtains continuous images of a precise spot (i.e., the distributed reference light 46) near the muzzle 25. As the barrel 24 elevates, the spot 46 moves vertically in the image 64. Standard video cameras now provide "4K" (3840×2160 pixels) at about 60 frames/second and "8K" versions are becoming available. Resolving the centroid of the spot 46 to one or two pixels will meet a 1 part in 4,000 resolution target for determining the barrel elevation angle 26.

In this example, a precise and distinct spot 46 on the barrel 24 is desired. The spot 46 is desirably stable and visible in all conditions, for example, when bright sky or the sun is also in the scene. The spot 46 may be made more distinct by several means:

Be inherently bright;

Match the image sensor 60 to a precisely known wavelength (e.g., color);

Confine detection to a narrow path of legitimate barrel 24 motion;

Focus the image at the spot 46 distance;

Reject extended objects such as the sun; and

Impose unique characteristics on the spot 46, such as modulating brightness at a known rate.

FIG. 2 illustrates optics to generate an intense narrowband spot 46. The spot 46 is preferably relatively small but intense and visible over a full range of barrel 24 angles. This unique optical approach includes:

An active spot generator (i.e., the reference light generator 40) is mounted on the barrel 24 near the muzzle 25, pointing or otherwise directed towards the turret 18;

A narrow, intense beam (i.e., the reference light 44) at a precise or single wavelength is generated by a low power laser diode (i.e., reference light source 48);

A small positive lens (i.e., lens 50) at the laser exit focuses the beam 44 to a very small spot (i.e., focal point 54); and A diffuser (i.e., diffuser 52) is placed at the focal point 54.

The diffuser 52 partially scatters the focused reference light 44 so that the spot 46 is visible over a wider angle as the barrel 24 elevates. Aiming the spot generator 40 backwards and providing a tubular hood (i.e., the housing 42) ensures that the spot 46 is preferably only visible from the turret 18. Because the laser wavelength is precisely defined, a filter 62 with a narrow passband can be used over the image sensor 60 to enhance contrast of the spot 46 against the background. Almost all non-spot light (even the sun) is strongly attenuated without dimming the spot 46.

The diffuser 52 used experimentally spreads light widely and equally in all axial directions. Spot 46 intensity can be further increased (or laser power reduced) by a diffuser 52 that concentrates the light 46 into a vertical stripe.

The camera's image sensor 60 may be optically or electronically masked to view only the anticipated vertical zone traversed by the spot 46. This can be sufficiently wide to tolerate any imperfect horizontal alignment of the camera 68. Extremely bright objects that appear within the region-of-interest stripe (e.g. barrel 24 pointed directly at the sun) can be further rejected by image processing software that filters out extended sources.

With a minor increase in laser drive complexity, rejection of non-spot sources may be obtained by rapidly varying laser brightness (amplitude modulation) and screening detected objects for this characteristic. This will discriminate strongly against steady natural sources, bright artificial lights and transient flashes.

The camera 68 is fixed to the turret 18 to view the spot 46 and may be above, alongside or below the barrel 24 wherever a clear sight line is available. Focus can be fixed at the spot 46 distance, blurring and dimming more distant objects. Lens 52 size and cost can be minimized because the spot 46 is relatively bright and aperture and focus control is not required. This approach can provide elevation measurements at video frame rates (typically 30 or 60 per second), substantially faster than expected barrel 24 and/or armored vehicle 10 motions.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An armored vehicle comprising:
a vehicle body portion;
a gun having a barrel extending away from the vehicle body portion at a barrel elevation angle; and
a weapon measurement system for determining barrel elevation, the weapon measurement system comprising:
a reference light generator arrangement mounted to the barrel and configured to generate a reference light one of at a single wavelength and within a narrow wavelength band and to diffuse the reference light, thereby defining a distributed reference light; and
an image sensor arrangement mounted to the vehicle body portion and comprising:
an image sensor configured to detect light including positional information associated with the light; and
a filter configured to substantially block light that is at a different wavelength than the distributed reference light while allowing the distributed reference light to pass through to the image sensor for determining the barrel elevation angle.

2. The armored vehicle of claim 1, wherein the vehicle body portion is a turret, and wherein the gun is coupled to the turret and the barrel extends away from the turret at the barrel elevation angle.

3. The armored vehicle of claim 1, wherein the reference light is at the single wavelength of from about 400 to about 1000 nm.

4. The armored vehicle of claim 1, wherein the reference light is within the narrow wavelength band that has a wavelength band width of from about 0.5 to about 50 nm that is from about 400 to about 1000 nm.

5. The armored vehicle of claim 1, wherein the reference light generator arrangement comprises a reference light source configured for generating the reference light.

6. The armored vehicle of claim 5, wherein the reference light source is a laser.

7. The armored vehicle of claim 5, wherein the reference light generator arrangement further comprises a diffuser configured for diffusing the reference light to form the distributed reference light.

8. The armored vehicle of claim 7, wherein the reference light generator arrangement further comprises a lens operatively disposed between the reference light source and the diffuser to focus the reference light to a focal point, and wherein the diffuser is disposed proximate the focal point to diffuse the reference light.

9. The armored vehicle of claim 1, wherein the image sensor arrangement comprises a camera that includes the image sensor and the filter.

10. The armored vehicle of claim 9, wherein the camera is operative to determine the barrel elevation angle based at least in part on the distributed reference light detected by the image sensor.

11. The armored vehicle of claim 1, further comprising a processor that is in communication with the image sensor arrangement and that is operative to determine the barrel elevation angle based at least in part on the distributed reference light detected by the image sensor.

12. The armored vehicle of claim 11, further comprising a ballistic computer system that includes the processor.

13. A weapon measurement system for an armored vehicle that includes a gun having a barrel adapted to extend at a barrel elevation angle, the weapon measurement system comprising:
   a reference light generator arrangement mountable to the barrel and configured to generate a reference light one of at a single wavelength and within a narrow wavelength band and to diffuse the reference light, thereby defining a distributed reference light; and
   an image sensor arrangement mountable to a vehicle body portion of the armored vehicle and comprising:
      an image sensor configured to detect light including positional information associated with the light; and
      a filter configured to substantially block light that is at a different wavelength than the distributed reference light while allowing the distributed reference light to pass through to the image sensor for determining the barrel elevation angle.

14. The weapon measurement system of claim 13, wherein the reference light generator arrangement comprises a reference light source configured for generating the reference light.

15. The weapon measurement system of claim 14, wherein the reference light generator arrangement further comprises a diffuser configured for diffusing the reference light to form the distributed reference light.

16. The weapon measurement system of claim 15, wherein the reference light generator arrangement further comprises a lens operatively disposed between the reference light source and the diffuser to focus the reference light to a focal point, and wherein the diffuser is disposed proximate the focal point to diffuse the reference light.

17. The weapon measurement system of claim 16, wherein the reference light generator arrangement further comprises a reference light generator housing that is configured to be mounted to the barrel, and wherein the reference light source, the lens, and the diffuser are disposed in the reference light generator housing.

18. The weapon measurement system of claim 13, wherein the image sensor arrangement comprises a camera that that is configured to be mounted to the vehicle body portion, and wherein the image sensor and the filter are disposed in the camera.

19. The weapon measurement system of claim 13, further comprising a processor that is in communication with the image sensor arrangement and that is operative to determine the barrel elevation angle based at least in part on the distributed reference light detected by the image sensor.

20. A method for determining barrel elevation of a barrel of a gun of an armored vehicle, the method comprising the steps of:
   generating a reference light at one of a single wavelength and within a narrow wavelength band via a reference light generator arrangement that is mounted to the barrel;
   diffusing the reference light to define a distributed reference light;
   filtering light via an image sensor arrangement that is mounted to a vehicle body portion of the armored vehicle to substantially block light that is at a different wavelength than the distributed reference light while allowing the distributed reference light passed through to an image sensor that is configured to detect light including positional information associated with the light; and
   detecting the distributed reference light via the image sensor for determining a barrel elevation angle.

* * * * *